United States Patent
Delfino

(10) Patent No.: US 9,915,063 B1
(45) Date of Patent: Mar. 13, 2018

(54) WALL PANEL CLIP AND HIGH WIND RESISTANT WALL PANEL SYSTEMS

(71) Applicant: Petersen Aluminum Corporation, Elk Grove Village, IL (US)

(72) Inventor: Salvatore J. Delfino, Coral Springs, FL (US)

(73) Assignee: Petersen Aluminum Corporation, Elk Grove Village, IL (US)

( * ) Notice: Subject to any disclaimer, the term of this patent is extended or adjusted under 35 U.S.C. 154(b) by 0 days.

(21) Appl. No.: 15/248,836

(22) Filed: Aug. 26, 2016

(51) Int. Cl.
*E04B 2/00* (2006.01)
*E04B 1/61* (2006.01)
*F16B 2/24* (2006.01)

(52) U.S. Cl.
CPC ............... *E04B 1/54* (2013.01); *F16B 2/241* (2013.01)

(58) Field of Classification Search
CPC .................................. E04B 1/54; F16B 2/241
USPC .......... 52/584.1, 586.1, 511, 506.06, 506.09, 52/547, 712
See application file for complete search history.

(56) References Cited

U.S. PATENT DOCUMENTS

| | | | | |
|---|---|---|---|---|
| 2,293,744 A | * | 8/1942 | Miles | E04F 13/007 52/543 |
| 2,369,480 A | * | 2/1945 | Mills | F16B 2/241 16/382 |
| 2,581,481 A | * | 1/1952 | Hartman | F16B 37/041 411/175 |
| 3,154,889 A | * | 11/1964 | Monroe | F16L 59/13 52/249 |
| 3,636,593 A | * | 1/1972 | Buttriss | F16B 1/00 24/294 |
| 4,164,346 A | * | 8/1979 | Sickler | E04F 21/1855 269/289 MR |
| 4,295,316 A | * | 10/1981 | Carlson | E04C 2/08 52/530 |
| 4,684,305 A | * | 8/1987 | Dubost | B42F 9/00 411/174 |
| 4,883,397 A | * | 11/1989 | Dubost | F16B 2/245 24/563 |
| 4,897,005 A | * | 1/1990 | Peterson | F16B 37/041 411/112 |
| 5,256,018 A | * | 10/1993 | Rattmann | F16B 37/041 411/112 |
| 5,537,791 A | * | 7/1996 | Champagne | E04F 13/0864 52/489.1 |

(Continued)

OTHER PUBLICATIONS

AEP Span, Technical Bulletin No. 35, "Prestige Series Clip", Revision 2.0, Aug. 18, 2011, (3 pages).

*Primary Examiner* — Basil S Katcheves
(74) *Attorney, Agent, or Firm* — Greer, Burns & Crain, Ltd.; Steven P. Fallon

(57) ABSTRACT

A unitary metal clip for a wall panel system. The unitary metal clip includes a hem portion configured and dimensioned to wrap around a flat end of a first panel of the wall panel system, and an angled kick portion extending away from the hem portion. The angled kick portion is configured and dimensioned to extend into a return of the first panel that is adjacent the flat end. The angled kick portion is further configured and dimensioned to deflect to accept a shaped end of a second panel of the wall panel system and snap back to lock the shaped end of the second panel into the return of the first panel. A fastener opening is located in the hem portion to accept a fastener to secure the flat end to a wall.

16 Claims, 5 Drawing Sheets

(56) References Cited

U.S. PATENT DOCUMENTS

| | | | | |
|---|---|---|---|---|
| 5,606,835 A | * | 3/1997 | Champagne | E04F 13/0842 52/520 |
| 5,675,955 A | * | 10/1997 | Champagne | E04F 13/0864 52/519 |
| 5,695,296 A | * | 12/1997 | Miura | B60R 19/24 403/2 |
| 5,878,543 A | * | 3/1999 | Mowery | E04F 13/0864 52/519 |
| 6,363,676 B1 | * | 4/2002 | Martion, III | E04F 13/0864 52/519 |
| 6,971,830 B2 | * | 12/2005 | Hulin | F16B 37/043 411/112 |
| D600,543 S | * | 9/2009 | Coles | D8/395 |
| 7,900,414 B2 | | 3/2011 | Seccombe | |
| 8,136,323 B2 | * | 3/2012 | King | E04F 13/0876 52/524 |
| 2008/0196346 A1 | * | 8/2008 | Gibbs | E04D 1/34 52/543 |
| 2010/0083602 A1 | * | 4/2010 | Pollack | E04D 1/34 52/584.1 |
| 2010/0251647 A1 | * | 10/2010 | Enns | E04F 13/081 52/302.1 |
| 2011/0154747 A1 | | 6/2011 | Kralic et al. | |
| 2011/0154766 A1 | | 6/2011 | Kralic et al. | |
| 2012/0079775 A1 | | 4/2012 | Chamberlin et al. | |

* cited by examiner

WALL PANEL CLIP AND HIGH WIND RESISTANT WALL PANEL SYSTEMS

FIELD

A field of the invention is wall panel systems. A particular field of the invention is metal wall panel systems.

BACKGROUND

Conventional wall panel systems are designed to be attached to an underlying building structure, such as a wall frame or subsurface. Attachment of the panels to the building structure is achieved by conventional screws or fasteners. Metal wall panel systems include wall, fascia and soffit applications. These systems have advantages, such as design flexibilities with visual effects, and easy, cost effective installations while providing additional strength. The panels are designed for wall, fascia and soffit applications where a flush or flat appearance is desired. For example, a rounded interlock leg and concealed fastening system improves the flush appearance while providing additional strength.

Metal wall panels are typically interlocked or overlapped with each other to enhance the bonding strength. A fastener is driven through the wall panels in an interface region of the panels and the wall frame or subsurface to firmly attach to the building structure. Such installations are unfortunately poorly suited for high wind zones. A high wind zone condition refers to, for example, a peak gust of greater than 90 miles per hour wind speed, as defined in American Society of Civil Engineering (ASCE) 7-10. More generally, high wind zones are areas that experience tropical storm conditions, including hurricane zones. The overlap, interface and fastener can fail in high wind zone conditions that other wall coverings might tolerate.

Higher wind resistance is generally beneficial, even outside of high wind zone areas. Abnormal weather conditions can produce equivalent winds in any geographic location, and the ability to withstand severe gusts that are more common in high wind zone areas is beneficial.

Recent efforts by one steel company, namely an AEP Span (hereinafter "AEP"), have provided a metal clip for providing improved panel performance in the high wind condition. As described in their Technical Bulletin #35 (hereinafter "Bulletin #35"), a 16-gauge, G90 galvanized steel is used for the clip, and a dimension of the clip includes a longitudinal length of 11.9 inches and a width of 1.0 inch. The AEP's clip presents a span of at least two wall panels for securement of adjacent panels. See, Bulletin #35, FIGS. 3 and 4. The clip spans an entire panel, including both end interface regions and a body region between the end interface regions.

This creates difficulties during installation. The clip must first be installed and separately aligned for proper panel installation, and then the panel installed over the clip. Further, each AEP's clip must use at least three fasteners for achieving attachment to the wall frame or subsurface. During installation, one end of the AEP's clip requires at least two fasteners and the other end of the clip requires at least one fastener to fixedly attach the clip to the building structure. This increases the installation time and expense. Moreover, a clip mounting hole located on the clip must be aligned with a fastener locating groove of each wall panel so that the fastener can hold the clip and panel together onto the wall frame or subsurface. A centerline indicator stamped above and below the clip mounting hole is used to properly align the clip relative to the corresponding wall panel.

SUMMARY OF THE INVENTION

A preferred clip of the invention is a unitary metal clip for a wall panel system. The unitary metal clip includes a hem portion configured and dimensioned to wrap around a flat end of a first panel of the wall panel system, and an angled kick portion extending away from the hem portion. The angled kick portion is configured and dimensioned to extend into a return of the first panel that is adjacent the flat end. The angled kick portion is further configured and dimensioned to deflect to accept a shaped end of a second panel of the wall panel system and snap back to lock the shaped end of the second panel into the return of the first panel. A fastener opening in the hem portion is located to accept a fastener to secure the flat end to a wall.

A preferred unitary metal clip provided by the invention includes a first end, a first plane extending from the first end, an approximate 180-degree curve extending from the first plane, a second plane extending from the curve and being opposed and substantially parallel to the first plane, an angled plane extending to a second end of the clip, where the angled plane is angled away from the first plane, and fastener openings through the first plane and the second plane.

A preferred wall panel system of the invention includes panels having a body feature and interface features on opposite ends. A first interface feature has a return extending into a flat terminal end and a second interface feature has a shaped end sized to fit into the return of another panel. A unitary clip for securing the first interface feature of one panel and the second interface feature of another panel is included in the wall panel system. The unitary clip includes a hem portion configured and dimensioned to wrap around a flat end of a first panel of the wall panel system, and an angled kick portion extending away from the hem portion. The angled kick portion is configured and dimensioned to extend into a return of the first panel that is adjacent the flat end. The angled kick portion is further configured and dimensioned to deflect to accept a shaped end of a second panel of the wall panel system and snap back to lock the shaped end of the second panel into the return of the first panel. A fastener opening in the hem portion is located to accept a fastener to secure the flat end to a wall.

A preferred wall panel system of the invention includes panels having a body feature and interface features on opposite ends. A first interface feature has a return extending into a flat terminal end and a second interface feature has a shaped end sized to fit into the return of another panel. A unitary clip for securing the first interface feature of one panel and the second interface feature of another panel is included in the wall panel system. The unitary clip includes a first end, a first plane extending from the first end, an approximate 180-degree curve extending from the first plane, a second plane extending from the curve and being opposed and substantially parallel to the first plane, an angled plane extending to a second end of the clip, where the angled plane is angled away from the first plane, and fastener openings through the first plane and the second plane.

DESCRIPTION OF THE PREFERRED EMBODIMENTS

Figure 1A:
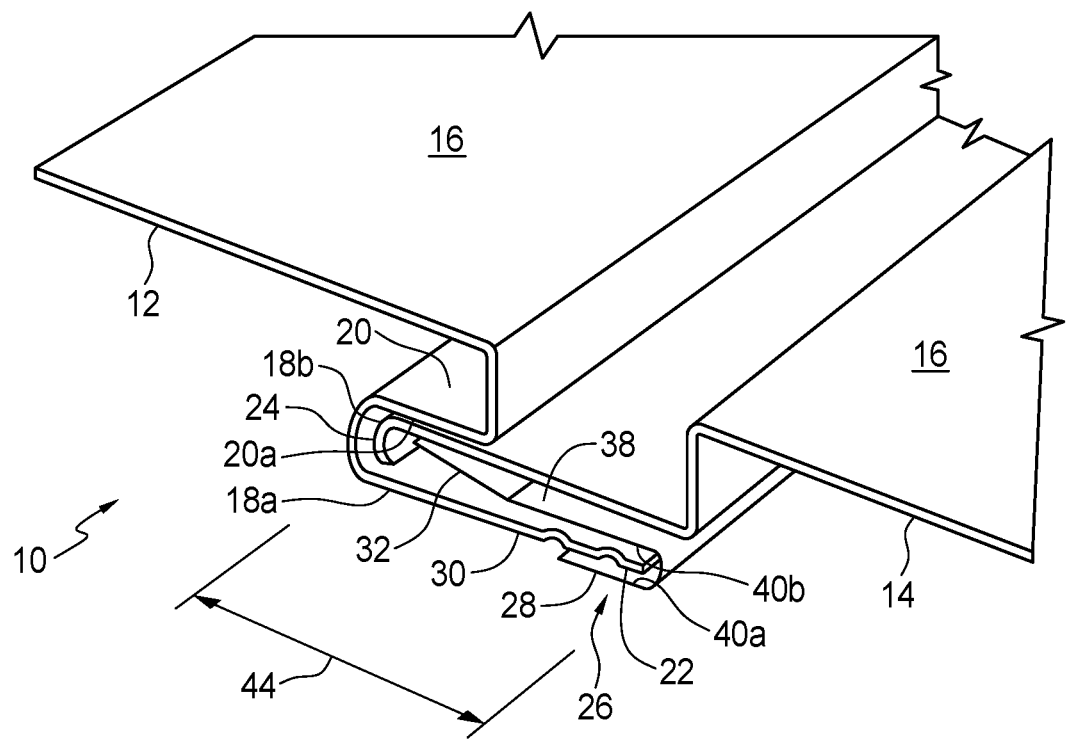
FIG. 1A is a perspective view of a preferred embodiment of a wall panel clip and high wind resistant wall panel system of the invention.

Preferred embodiments of the invention provide a metal wall panel clip for enhancing an attachment capacity and providing easy, convenient installation for an underlying building structure without sacrificing structural requirements of wall panel systems.

Preferred embodiments of the invention provide wall panel systems having metal wall panel clips for aiding installation of wall panels during assembly and increasing panel strength and stiffness during use.

A preferred example application of the invention is a high wind resistant wall panel system that has a metal wall panel clip constructed to secure the wall panels onto a building structure. Another example application of the invention is a system that has an interlocking panel system designed to enclose a wall of the building structure. Another example application of the invention is a system that has a wall panel system attached to a wall frame or subsurface using fasteners.

Metal wall panel clips and systems of the invention provide easy, convenient assembly and installation operations and reduce the operation time and related expenses. Preferred clips extend only in the interface region of adjoining wall panels, making installation easy. This results in faster and simple assembly and installation operations.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1B:
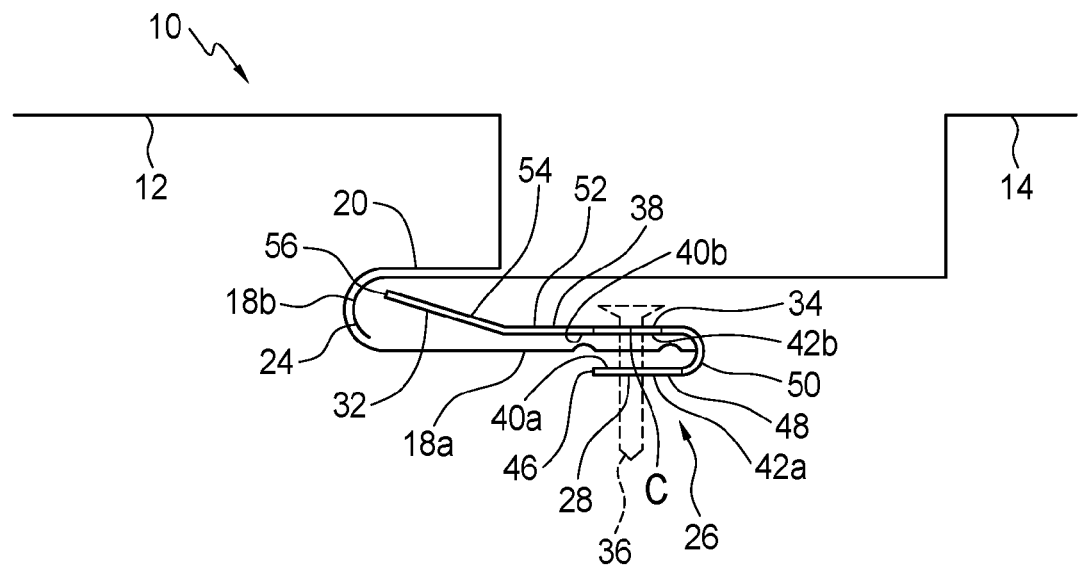
FIG. 1B is a side cross-sectional view of the wall panel clip and high wind resistant wall panel system of FIG. 1A, featuring reveal panels.
Figure 1C:
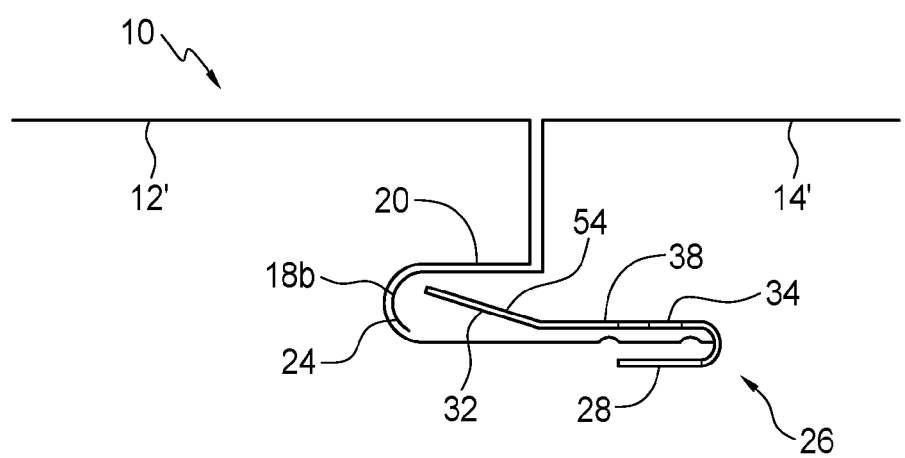
FIG. 1C is a side cross-sectional view of the wall panel clip and high wind resistant wall panel system of FIG. 1A, featuring flush panels.

FIGS. 1A-1C illustrate a preferred embodiment wall panel system 10 for aiding attachment and securement of high wind resistant wall panels 12, 14 onto a building structure. Each of the panels 12, 14 has a body feature 16 and interface features 18a, 18b on opposite ends. A first interface feature 18a has a return 20 extending into a flat terminal end 22, and a second interface feature 18b has a shaped end 24 sized to fit into the return of another panel.

More specifically, FIG. 1B shows the preferred embodiment wall panel system 10, featuring reveal wall panels 12 and 14, but FIG. 1C shows the same panel system, featuring flush wall panels 12' and 14'. For example, the flush wall panels 12' and 14' are constructed and arranged for providing a flush or flat appearance when assembled, whereas the reveal wall panels 12 and 14 are constructed and arranged for providing a gap appearance between the panels when assembled. Other suitable types of wall panels are contemplated to suit the application. Components shared with the panels 12, 12', 14, 14' are designated with identical reference numbers.

A unitary clip 26 is provided for securing the first interface feature 18a of one panel 12 and the second interface feature 18b of another panel 14. The clip 26 secures adjacent first and second wall panels 12, 14 to a subsurface or frame of the building structure, and can resist high wind conditions. The unitary clip 26 includes a hem portion 28 configured and dimensioned to wrap around a flat end 30 of a first panel 12 of the wall panel system 10.

An angled kick portion 32 extends away from the hem portion 28, and is configured and dimensioned to extend into the return 20 of the first panel 12 that is adjacent the flat end 30. The angled kick portion 32 is further configured and dimensioned to deflect to accept the shaped end 24 of a second panel 14 of the wall panel system 10 and snap back to lock the shaped end 24 of the second panel into the return 20 of the first panel 12. Specifically, the shaped end 24 slides between an upper surface 20a of the return 20 and the angled kick portion 32 by deflecting the angled kick portion away from the upper surface 20a. A fastener opening 34 (FIG. 1B) is located in the hem portion 28 to accept a fastener 36 (shown in phantom) to secure the flat end 30 to a wall. The fastener 36 can be, for example, a helically-threaded screw, or other suitable fasteners known in the art.

A planar portion 38 extends from the hem portion 28 into the angled kick portion 32. It is preferred that the hem portion 28 is U-shaped. The hem portion 28 includes opposing surfaces 40a, 40b. The fastener opening 34 includes an opening 42a, 42b in each of the opposing surfaces 40a, 40b. It is preferred that the opposing surfaces 40a, 40b are substantially parallel, and are separated by an approximate width of the flat end 30.

A preferred clip 26 is made of a single, unitary piece of galvanized 24-gauge steel sheet or plate, which is substantially thinner and lighter than conventional clips when, for example, compared to the AEP's 16-gauge clip. Thus, it is advantageous that the clip 26 reduces manufacturing expenses and material costs. The clip 26 is preferably made using a die press as a unitary construction. Residual materials collected from panel scraps of the panel system 10 may also be used for production of the clip 26 for addressing environmental concerns and saving manufacturing costs.

The clip 26 is dimensioned to substantially match a length 44 (FIG. 1A) of the interface between the first and second panels 12, 14 and not extend beyond the interface of the first and second panels. As shown in FIG. 1A, the first panel 12 joins the second panel 14 along a longitudinal edge of the second panel by interlocking the first and second panels in an assembled state.

The clip 26 secures the panels 12 and 14 where the panels interlock and overlap with each other. The clip 26 is sized in general accordance with the interface length 44 of the two panels 12 and 14, and does not extend beyond the interface length. As compared to the dimensions of AEP's clip discussed in the background, the clip 26 has a smaller configuration that provides an easier and more convenient handling and transportation during installation.

A wall panel system 10 includes the first and second panels 12, 14 having the body feature 16 and interface features 18a, 18b on opposite ends. The first interface feature 18a has the return 20 extending into the flat terminal end 22 and the second interface feature 18b has the shaped end 24 sized to fit into the return of another panel. The unitary clip 26 is provided for securing the first interface feature 18a of the first panel 12 and the second interface feature 18b of the second panel 14.

As shown in FIG. 1B, the unitary clip 26 includes a first end 46, a first plane 48 extending from the first end, an approximate 180-degree curve 50 extending from the first plane, a second plane 52 extending from the curve and being opposed and substantially parallel to the first plane, an angled plane 54 extending to a second end 56 of the clip. The angled plane 54 is angled away from the first plane 48. The fastener opening 34 is provided through the first plane 48 and the second plane 52.

The hem portion 28 includes the first plane 48 and the second plane 52, and is preferably U-shaped. The first plane 48 and the second plane 52 are displaced by a predetermined distance. The angled plane 54 resiliently pivots between an original position and a deflected position.

Figure 2:
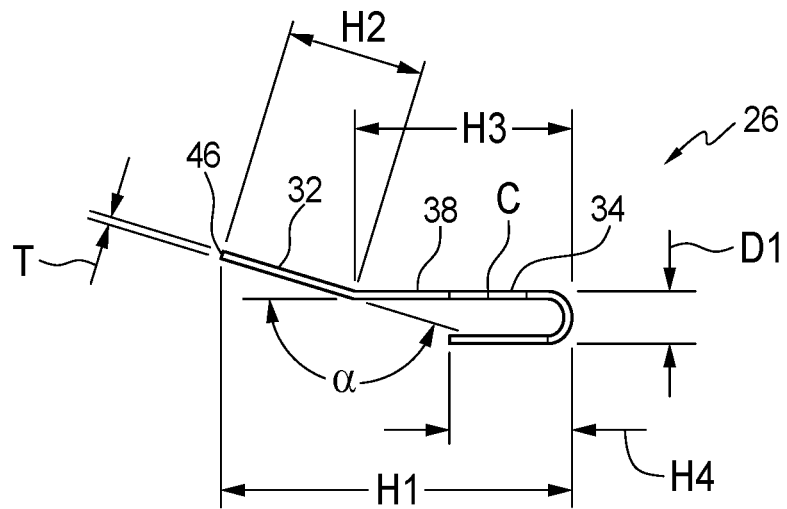
FIG. 2 is a side cross-sectional view of the clip of FIG. 1A.
Figure 3:
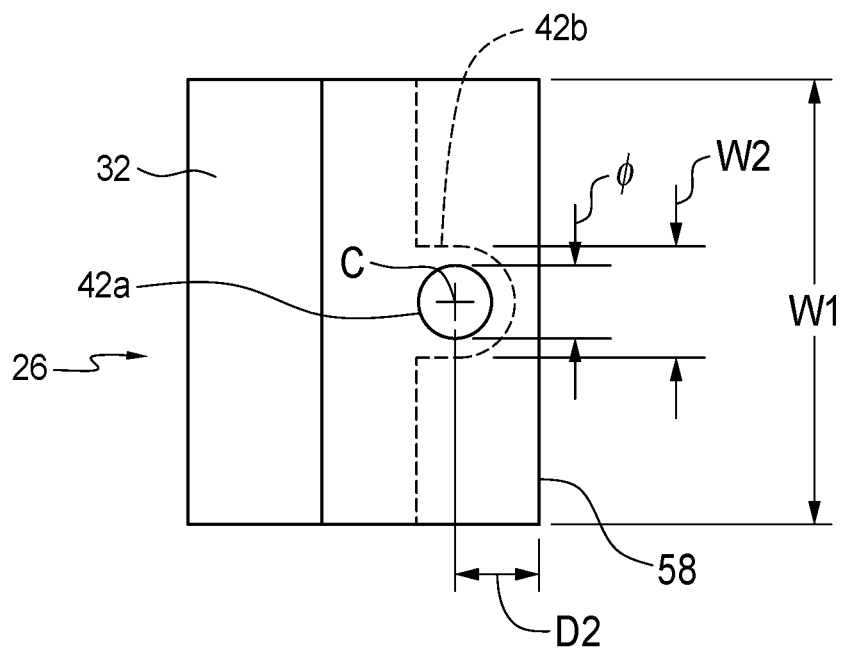
FIG. 3 is a plan view of the clip of FIG. 2.

FIGS. 2 and 3 illustrate exemplary configurations and dimensions of the clip 26. In a preferred embodiment, an exemplary overall width W1 of the clip 26 is approximately 1.50 inches, and an exemplary overall height H1 of the clip is approximately 1.15 inches. The height H1 of the clip 26 is less than a length of the interface of the first and second wall panels 12, 14 in the assembled state. It is preferred that an exemplary thickness T of the clip 26 is approximately 0.03 inch. Although specific dimensions of the clip 26 are shown, other suitable dimensions within tolerable ranges are also contemplated to suit different sized wall panels.

In a preferred embodiment, the angled kick portion 32 of the clip 26 includes the planar surface having a predetermined height H2, and is angled or inclined at a predetermined angle α relative to the planar portion 38 of the clip. It is contemplated that the predetermined angle α is defined by the angled kick portion 32 and the planar portion 38 of the clip 26. An exemplary value of the predetermined angle α is approximately 162° (degrees), and an exemplary height H2 is approximately 0.45 inch.

The first plane 48 and the second plane 52 are spatially displaced or separated from each other at a predetermined distance D1 in substantially parallel relationship, relative to the first and second planes, respectively. An exemplary predetermined distance D1 between the first and second planes 48, 52 is approximately 0.18 inches. An exemplary height H3 of the second plane 52 is approximately 0.72 inch, and an exemplary height H4 of the first plane 48 is approximately 0.41 inch.

As shown in FIG. 3, an exemplary diameter Ø of the opening 42a is approximately 0.25 inch, and a center C of the opening 42a is positioned at a predetermined distance D2 from a bottom peripheral edge 58 of the clip 26. An exemplary perpendicular distance D2 between the center C and the bottom peripheral edge 58 is approximately 0.28 inch.

Also, an exemplary width W2 of the opening 42b is approximately 0.38 inch. The opening 42b can also be a throughbore or any suitable opening for receiving the fastener 36.

It is preferred that the clip 26 has a quadrilateral shape when viewed from above, such as a rectangular or square shape. However, other suitable shapes, such as oval, elliptical, rounded square shapes, or the like, are contemplated to suit different applications.

Figure 4:
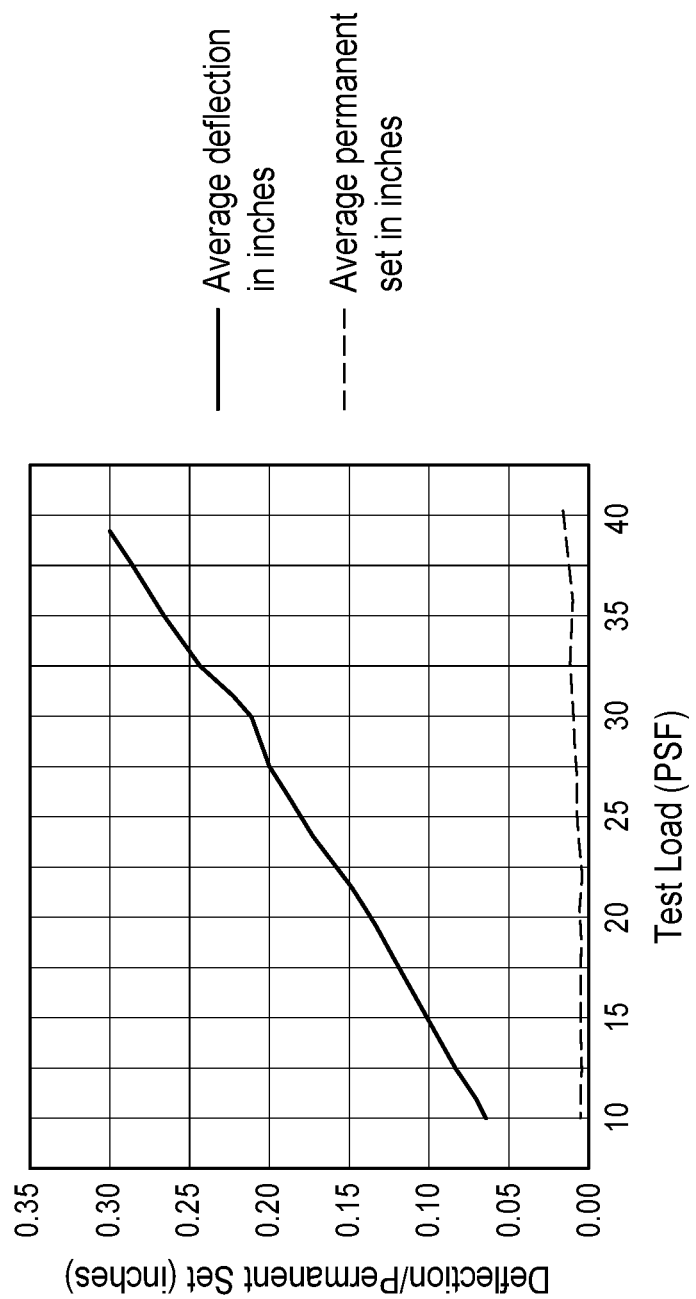
FIG. 4 is a graphical representation of first test results of the exemplary panel system without using the clip of FIG. 2.

FIG. 4 illustrates a graphical representation of first test results of the panel system 10 without using the present clip 26 is illustrated. The ASTM E 1592-05, Standard Test Method for Structural Performance of Sheet Metal Systems by Uniform Static Air Pressure Difference is used. In this test, the panel system 10 having twelve full width aluminum panels is fastened to the subsurfaces of the building structure, and the panels are measured at overall 13.5" (inches) wide with a 12" wide coverage by 0.032" thickness and 288" length. Each panel of the panel system 10 is not fastened with the clip 26, but is fastened with conventional one-inch long pancake head screws and interlocked with adjacent panels at opposite sides. An exemplary deflection table TABLE 1 associated with FIG. 4 is shown below:

TABLE 1

| Sample A-1 | | Temperature: 81° F. | | | Barometric Reading: 30.09 | | | |
|---|---|---|---|---|---|---|---|---|
| | | Negative Pressure: Each load was held for sixty seconds | | | | | | |
| Loads | | | DEFLECTION TABLE MEASUREMENTS | | | | | |
| (PSF) | D-1 | D-2 | D-3 | D-4 | D-5 | D-6 | D-7 | D-8 |
| 2.33 PSF | 0.003" | 0.005" | 0.006" | 0.015" | 0.014" | 0.006" | 0.007" | 0.007" |
| 10 PSF | 0.031" | 0.045" | 0.047" | 0.122" | 0.118" | 0.043" | 0.048" | 0.067" |
| 2.33 PSF | 0.003" | 0.006" | 0.007" | 0.015" | 0.015" | 0.005" | 0.008" | 0.008" |
| 15 PSF | 0.047" | 0.068" | 0.071" | 0.183" | 0.180" | 0.064" | 0.072" | 0.103" |
| 2.33 PSF | 0.002" | 0.006" | 0.006" | 0.013" | 0.014" | 0.005" | 0.007" | 0.009" |
| 20 PSF | 0.064" | 0.094" | 0.099" | 0.258" | 0.254" | 0.090" | 0.100" | 0.151" |
| 2.33 PSF | 0.003" | 0.005" | 0.006" | 0.013" | 0.015" | 0.006" | 0.007" | 0.011" |
| 25 PSF | 0.085" | 0.125" | 0.131" | 0.338" | 0.332" | 0.122" | 0.132" | 0.232" |
| 2.33 PSF | 0.003" | 0.006" | 0.007" | 0.014" | 0.016" | 0.006" | 0.007" | 0.013" |
| 30 PSF | 0.099" | 0.145" | 0.152" | 0.397" | 0.390" | 0.144" | 0.155" | 0.311" |
| 2.33 PSF | 0.003" | 0.006" | 0.006" | 0.014" | 0.016" | 0.005" | 0.008" | 0.013" |
| 35 PSF | 0.114" | 0.168" | 0.175" | 0.464" | 0.456" | 0.168" | 0.180" | 0.411" |
| 2.33 PSF | 0.003" | 0.007" | 0.007" | 0.018" | 0.020" | 0.006" | 0.008" | 0.014" |
| 40 PSF | 0.133" | 0.196" | 0.204" | 0.532" | 0.524" | 0.097" | 0.209" | 0.519" |
| 2.33 PSF | 0.003" | 0.006" | 0.007" | 0.017" | 0.020" | 0.007" | 0.008" | 0.017" |

NOTES:
The ultimate load achieved was 40 PSF.
2.33 PSF represents the zero load condition.

As illustrated in TABLE 1 and FIG. 4, the ultimate load achieved by the panel system 10 is only 40 PSF (Pounds per Square Foot) when not using the clip 26. A failure of the panel system 10 occurs at 45 PSF in this test.

Figure 5:
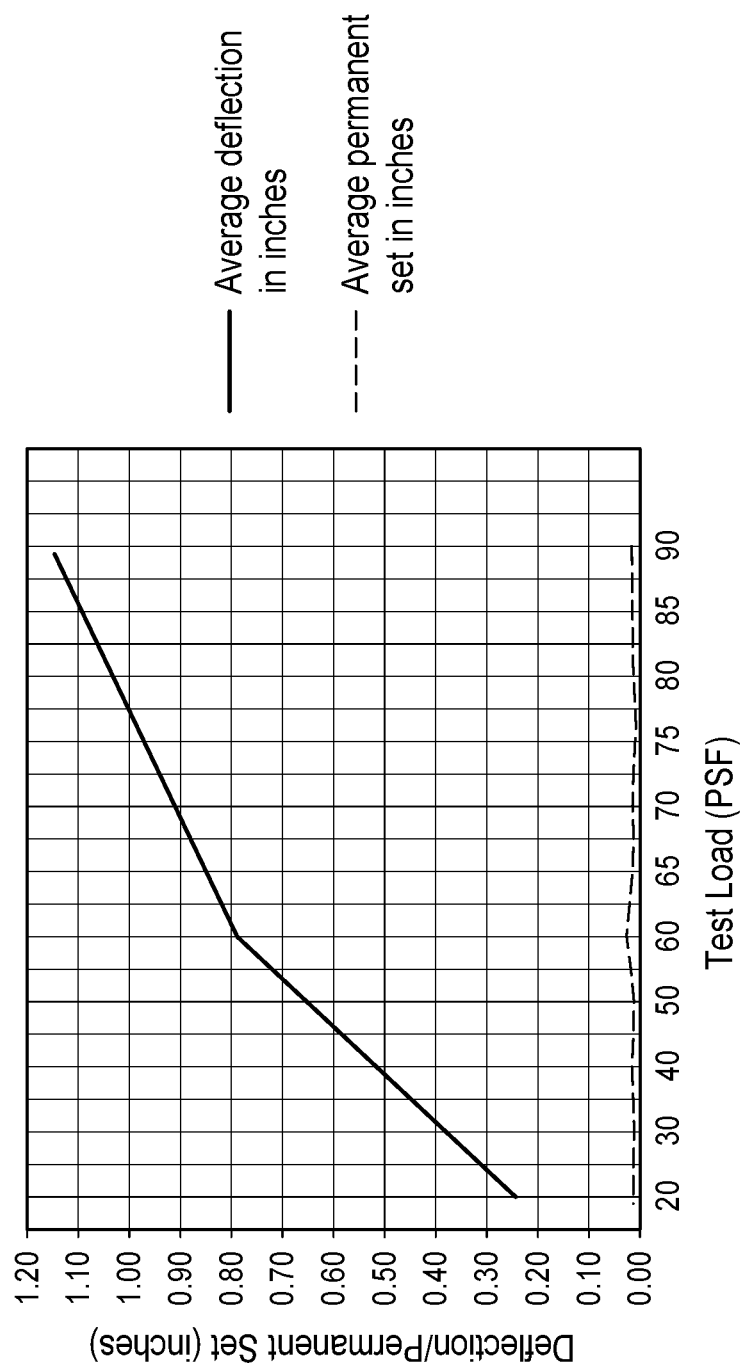
FIG. 5 is a graphical representation of second test results of the exemplary panel system using the clip of FIG. 2.

FIG. 5 illustrates a graphical representation of second test results of the panel system 10 using the present clip 26 is illustrated. The ASTM E 1592-05, Standard Test Method for Structural Performance of Sheet Metal Systems by Uniform Static Air Pressure Difference is used. In this test, a similar panel configuration of the panel system 10 of FIG. 4 is used for testing. However, each panel of the panel system 10 is fastened with the clip 26 along with conventional one-inch long pancake head screws and interlocked with adjacent panels at opposite sides. An exemplary deflection table TABLE 2 associated with FIG. 5 is shown below:

TABLE 2

Sample A-1　　Temperature: 80.0° F.　　Barometric Reading: 30.28 inches Hg
Negative Pressure: Each load was held for sixty seconds
Loads　　DEFLECTION TABLE MEASUREMENTS

| (PSF) | D-1 | D-2 | D-3 | D-4 | D-5 | D-6 | D-7 | D-8 |
|---|---|---|---|---|---|---|---|---|
| 2.33 PSF | 0.009" | 0.013" | 0.016" | 0.011" | 0.015" | 0.018" | 0.006" | 0.017" |
| 20.0 PSF | 0.189" | 0.206" | 0.230" | 0.202" | 0.222" | 0.301" | 0.237" | 0.310" |
| 2.33 PSF | 0.012" | 0.015" | 0.019" | 0.013" | 0.017" | 0.021" | 0.009" | 0.021" |
| 30.0 PSF | 0.293" | 0.317" | 0.350" | 0.239" | 0.361" | 0.462" | 0.359" | 0.480" |
| 2.33 PSF | 0.018" | 0.022" | 0.026" | 0.019" | 0.022" | 0.030" | 0.019" | 0.030" |
| 40.0 PSF | 0.415" | 0.448" | 0.488" | 0.471" | 0.517" | 0.627" | 0.493" | 0.654" |
| 2.33 PSF | 0.013" | 0.017" | 0.022" | 0.014" | 0.018" | 0.024" | 0.011" | 0.024" |
| 50.0 PSF | 0.529" | 0.569" | 0.615" | 0.596" | 0.651" | 0.751" | 0.597" | 0.794" |
| 2.33 PSF | 0.012" | 0.017" | 0.023" | 0.014" | 0.019" | 0.027" | 0.012" | 0.025" |
| 60.0 PSF | 0.663" | 0.711" | 0.763" | 0.754" | 0.819" | 0.893" | 0.720" | 0.950" |
| 2.33 PSF | 0.014" | 0.019" | 0.026" | 0.017" | 0.021" | 0.030" | 0.014" | 0.028" |
| 65.0 PSF | 0.715" | 0.763" | 0.812" | 0.811" | 0.878" | 0.962" | 0.772" | 1.029" |
| 2.33 PSF | 0.014" | 0.020" | 0.026" | 0.017" | 0.020" | 0.034" | 0.013" | 0.030" |
| 70.0 PSF | 0.772" | 0.820" | 0.865" | 0.880" | 0.953" | 1.030" | 0.826" | 1.107" |
| 2.33 PSF | 0.016" | 0.022" | 0.028" | 0.018" | 0.021" | 0.075" | 0.017" | 0.033" |
| 75.0 PSF | 0.831" | 0.878" | 0.916" | 0.941" | 1.020" | 1.090" | 0.880" | 1.181" |
| 2.33 PSF | 0.014" | 0.021" | 0.028" | 0.017" | 0.021" | 0.037" | 0.015" | 0.033" |
| 80.0 PSF | 0.886" | 0.934" | 0.968" | 0.993" | 1.076" | 1.149" | 0.929" | 1.250" |
| 2.33 PSF | 0.017" | 0.024" | 0.031" | 0.019" | 0.027" | 0.042" | 0.020" | 0.037" |
| 85.0 PSF | 0.942" | 0.990" | 1.031" | 1.044" | 1.134" | 1.208" | 0.979" | 1.318" |
| 2.33 PSF | None | None | None | None | None | None | None | None |
| 90.0 PSF | 0.998" | 1.043" | 1.083" | 1.100" | 1.193" | 1.272" | 1.030" | 1.392" |

NOTES:
The ultimate load achieved was 90.0 PSF. The system failed at 93.0 PSF.
2.33 PSF represents the zero load condition.

As illustrated in TABLE 2 and FIG. 5, the ultimate load achieved by the panel system 10 is 90 PSF, which is a performance increase of approximately 125% compared to the test results shown in FIG. 4. Further, a failure of the panel system 10 occurs at 93 PSF in this test, which is also an improved performance of the panel system 10 by approximately 106.7%. As demonstrated, it is advantageous that the present clip 26 provides an enhanced attachment to the underlying building structure and improved resistance to high wind loads.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A wall panel system comprising:
   panels having a body feature and interface features on opposite ends, a first interface feature comprising a return extending into a flat terminal end and a second interface feature comprising a shaped end sized to fit into the return of another panel; and
   a unitary clip for securing the first interface feature of one panel and the second interface feature of another panel, the unitary clip comprising:
   a hem portion configured and dimensioned to wrap around the flat end of a first panel of the wall panel system;
   an angled kick portion extending away from said hem portion, said angled kick portion being configured and dimensioned to extend into the return of the first panel that is adjacent the flat end, said angled kick portion further being configured and dimensioned to deflect to accept the shaped end of the second panel of the wall panel system and snap back to lock the shaped end of the second panel into the return of the first panel; and
   a fastener opening in the hem portion located to accept a fastener to secure the flat end to a wall.

2. The wall panel system of claim 1, further comprising a planar portion extending from said hem portion into said angled kick portion.

3. The wall panel system of claim 1, wherein said hem portion is U-shaped.

4. The wall panel system of claim 1, wherein said hem portion comprises opposing surfaces.

5. The wall panel system of claim 4, wherein said fastener opening comprises an opening in each of said opposing surfaces.

6. The wall panel system of claim 4, wherein said opposing surfaces are substantially parallel.

7. The wall panel system of claim 6, wherein the opposing surfaces are separated by the approximate width of the flat end.

8. The wall panel system of claim 1, wherein the clip is dimensioned to substantially match a length of the interface between the first and second panels and not extend beyond the interface of the first and second panels.

9. A wall panel system comprising:
   panels having a body feature and interface features on opposite ends, a first interface feature comprising a return extending into a flat terminal end and a second interface feature comprising a shaped end sized to fit into the return of another panel; and
   a unitary clip for securing the first interface feature of one panel and the second interface feature of another panel, the unitary clip comprising:

a first end, a first plane extending from said first end, an approximate 180-degree curve extending from said first plane defining a space to accommodate the first terminal end, a second plane extending from said curve and being opposed and substantially parallel to said first plane, an angled plane extending to a second end of the clip, said angled plane being angled away from said first plane to extend into the return and the shaped end, and fastener openings through said first plane and said second plane.

10. The wall panel system of claim 9, further comprising a hem portion having said first plane and said second plane.

11. The wall panel system of claim 10, wherein said hem portion is U-shaped.

12. The wall panel system of claim 10, wherein said hem portion comprises opposing surfaces.

13. The wall panel system of claim 12, wherein each of said fastener openings includes an opening in each of said opposing surfaces.

14. The wall panel system of claim 9, wherein said first plane and said second plane are displaced by a predetermined distance.

15. The wall panel system of claim 9, wherein said angled plane resiliently pivots between an original position and a deflected position.

16. A wall panel system comprising:
panels having a body feature and interface features on opposite ends, a first interface feature comprising a return extending into a flat terminal end and a second interface feature comprising a shaped end sized to fit into the return of another panel; and
a unitary clip for securing the first interface feature of one panel and the second interface feature of another panel, the unitary clip comprising:
a hem portion for wrapping around the flat terminal end of a first panel of the wall panel system;
kick means for extending into the return of the first panel that is adjacent the flat end, for deflecting to accept the shaped end of a second panel of the wall panel system, and for snapping back to lock the shaped end of the second panel into the return of the first panel; and
an opening for accepting a fastener to secure the flat end to a wall.

* * * * *